United States Patent
Koo

(10) Patent No.: US 10,801,446 B2
(45) Date of Patent: Oct. 13, 2020

(54) METHOD FOR MONITORING LEAKAGE OF EXHAUST GAS RECIRCULATION SYSTEM FOR ENGINE

(71) Applicants: HYUNDAI MOTOR COMPANY, Seoul (KR); KIA MOTORS CORPORATION, Seoul (KR)

(72) Inventor: Bon Chang Koo, Seongnam-Si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/175,244

(22) Filed: Oct. 30, 2018

(65) Prior Publication Data

US 2020/0018269 A1  Jan. 16, 2020

(30) Foreign Application Priority Data

Jul. 11, 2018 (KR) ......................... 10-2018-0080381

(51) Int. Cl.
*F02M 26/49* (2016.01)
*F02D 41/00* (2006.01)
*F02M 26/00* (2016.01)

(52) U.S. Cl.
CPC ......... *F02M 26/49* (2016.02); *F02D 41/0052* (2013.01); *F02M 2026/009* (2016.02)

(58) Field of Classification Search
CPC .............. F02M 26/49; F02M 2026/009; F02D 41/0052
See application file for complete search history.

(56) References Cited

U.S. PATENT DOCUMENTS

| | | | | |
|---|---|---|---|---|
| 5,094,213 A | * | 3/1992 | Dudek | ..................... F02D 37/00 123/339.27 |
| 6,115,653 A | * | 9/2000 | Bergstrom | .............. F02D 41/22 701/31.7 |
| 9,181,887 B2 | * | 11/2015 | Surnilla | .............. F02D 41/0052 |

FOREIGN PATENT DOCUMENTS

| | | |
|---|---|---|
| JP | 2010-242617 A | 10/2010 |
| JP | 5246298 B2 | 7/2013 |
| KR | 10-2012-0119339 A | 10/2012 |

* cited by examiner

*Primary Examiner* — Hieu T Vo
(74) *Attorney, Agent, or Firm* — Morgan, Lewis & Bockius LLP

(57) ABSTRACT

A method for monitoring leakage of an exhaust gas recirculation system for an engine of a vehicle includes: determining, by a controller, whether the engine is in an idle state in which the exhaust gas recirculation system is not operated; determining, by the controller, whether small flow leakage of the exhaust gas recirculation system occurs based on a predicted pressure of gas sucked into an intake manifold connected to the engine and a measured pressure of gas sucked into the intake manifold when the engine is in the idle state; and determining, by the controller, that leakage of the exhaust gas recirculation system occurs when the measured pressure is greater than the predicted pressure.

7 Claims, 6 Drawing Sheets

METHOD FOR MONITORING LEAKAGE OF EXHAUST GAS RECIRCULATION SYSTEM FOR ENGINE

CROSS-REFERENCE TO RELATED APPLICATION

This application claims priority to and the benefit of Korean Patent Application No. 10-2018-0080381 filed in the Korean Intellectual Property Office on Jul. 11, 2018, the entire contents of which are incorporated herein by reference.

TECHNICAL FIELD

The present disclosure relates to a vehicle, and more particularly, to a method for monitoring leakage of an exhaust gas recirculation system for an engine of a vehicle.

BACKGROUND

A diesel vehicle generally includes an exhaust gas recirculation (EGR) device for reducing nitrogen oxides (NOx) among exhaust gases generated by driving of a vehicle engine are employed.

In general, the EGR device is mounted at an intermediate position of a pipe connecting an EGR valve to an exhaust manifold and an intake manifold, and the EGR amount is determined by an opening degree of the EGR valve.

When leakage occurs in the EGR device, an exhaust gas emission amount increases, the engine idle instability occurs, and overall driving performance of the vehicle deteriorates. Therefore, leakage diagnosis of the EGR device is regulated.

Generally, an exhaust gas of the engine contains a large amount of harmful components such as CO, HC, and nitrogen compound (NOx). When a combustion temperature of the engine is increased, an amount of NOx increases. Therefore, in order to reduce the amount of NOx in the exhaust gas, it is necessary to reduce the combustion temperature of the engine.

Instantaneous high temperature heat may be generated as a propagation speed of a flame ignited in a spark plug is increased in a state where density of fuel-air mixture is high in a combustion chamber of the engine, thereby increasing the combustion temperature of the engine.

An exhaust gas recirculation (EGR) method may introduce a part of the exhaust gas into the combustion chamber by including the part of the exhaust gas in the fuel-air mixture, thereby reducing the density of the fuel-air mixture without changing air-fuel ratio of the fuel-air mixture. Thus, the exhaust gas recirculation method may reduce the combustion temperature of the engine to reduce the amount of NOx in the exhaust gas.

The exhaust gas recirculation method is used not only to reduce the amount of NOx in the exhaust gas but also to improve fuel economy of the engine. By using the exhaust gas recirculation method, the temperature of the combustion chamber may be lowered to reduce the amount of NOx, and at the same time, an ignition timing of the engine may be advanced in order to avoid a knocking occurrence region. Thus, an output of the engine may be improved and fuel economy of the vehicle may be improved.

The above information disclosed in this Background section is only for enhancement of understanding of the background of the invention, and therefore, it may contain information that does not form the prior art that is already known in this country to a person of ordinary skill in the art.

SUMMARY

The present disclosure has been made in an effort to provide a method for monitoring leakage of an exhaust gas recirculation system for an engine of a vehicle which is capable of diagnosing or detecting a small amount of flow leakage of the exhaust gas recirculation system for the engine.

An exemplary embodiment of the present disclosure may provide a method for monitoring leakage of an exhaust gas recirculation system for an engine of the vehicle, including: determining, by a controller, whether the engine is in an idle state in which the exhaust gas recirculation system is not operated; determining, by the controller, whether leakage of the exhaust gas recirculation system occurs based on a predicted pressure of gas sucked into an intake manifold connected to the engine and a measured pressure of gas sucked into the intake manifold when the engine is in the idle state; and determining, by the controller, that leakage of the exhaust gas recirculation system occurs when the measured pressure is greater than the predicted pressure.

The method for monitoring leakage of the exhaust gas recirculation system for the engine may further include: when it is determined that leakage occurs, determining, by the controller, finally that leakage of the exhaust gas recirculation system occurs based on a measured pressure of a gas sucked into the intake manifold according to an opening angle of an exhaust gas recirculation system valve, a measured pressure of a gas sucked into the intake manifold according to a closing of the exhaust gas recirculation system valve after the exhaust gas recirculation system valve is operated at the opening angle, a predicted pressure of the gas sucked into the intake manifold according to the opening angle of the exhaust gas recirculation system valve, and a predicted pressure of the gas sucked into the intake manifold according to the closing of the exhaust gas recirculation system valve after the exhaust gas recirculation system valve is operated at the opening angle in a state where fuel supply to the engine is cut-off. The first measured pressure calculated using the measured pressure of the gas sucked into the intake manifold according to the opening angle of the exhaust gas recirculation system valve and the measured pressure of the gas sucked into the intake manifold according to the closing of the exhaust gas recirculation valve after the exhaust gas recirculation valve is operated at the opening angle may be greater than a first predicted pressure calculated using the predicted pressure of the gas sucked into the intake manifold according to the opening angle of the exhaust gas recirculation valve and the predicted pressure of the gas sucked into the intake manifold according to the closing of the exhaust gas recirculation valve after the exhaust gas recirculation valve is operated at the opening angle.

The controller may determine the predicted pressure of the gas based on a number of rotation of the engine.

The determining finally that leakage of the exhaust gas recirculation system occurs may include: determining, by the controller, firstly that leakage of the exhaust gas recirculation system occurs based on a measured pressure of a gas sucked into the intake manifold according to a first opening angle of the exhaust gas recirculation system valve, a measured pressure of a gas sucked into the intake manifold according to a closing of the exhaust gas recirculation system valve after the exhaust gas recirculation system valve is operated at the first opening angle, a predicted pressure of the gas sucked into the intake manifold according to the first opening angle of the exhaust gas recirculation system valve, and a predicted pressure of the gas sucked into the intake manifold according to the closing of the exhaust gas recirculation system valve after the exhaust gas recirculation system valve is operated at the first opening angle; and determining, by the controller, secondly that leakage of the exhaust gas recirculation system occurs based on a measured pressure of a gas sucked into the intake manifold according to a second opening angle of the exhaust gas recirculation system valve, a measured pressure of a gas sucked into the intake manifold according to a closing of the exhaust gas recirculation system valve after the exhaust gas recirculation system valve is operated at the second opening angle, a predicted pressure of the gas sucked into the intake manifold according to the second opening angle of the exhaust gas recirculation system valve, and a predicted pressure of the gas sucked into the intake manifold according to the closing of the exhaust gas recirculation system valve after the exhaust gas recirculation system valve is operated at the second opening angle. The second measured pressure calculated using the measured pressure of the gas sucked into the intake manifold according to the first opening angle of the exhaust gas recirculation system valve and the measured pressure of the gas sucked into the intake manifold according to the closing of the exhaust gas recirculation valve after the exhaust gas recirculation valve is operated at the first opening angle may be greater than a second predicted pressure calculated using the predicted pressure of the gas sucked into the intake manifold according to the first opening angle of the exhaust gas recirculation valve and the predicted pressure of the gas sucked into the intake manifold according to the closing of the exhaust gas recirculation valve after the exhaust gas recirculation valve is operated at the first opening angle. The third measured pressure calculated using the measured pressure of the gas sucked into the intake manifold according to the second opening angle of the exhaust gas recirculation system valve and the measured pressure of the gas sucked into the intake manifold according to the closing of the exhaust gas recirculation valve after the exhaust gas recirculation valve is operated at the second opening angle may be greater than a third predicted pressure calculated using the predicted pressure of the gas sucked into the intake manifold according to the second opening angle of the exhaust gas recirculation valve and the predicted pressure of the gas sucked into the intake manifold according to the closing of the exhaust gas recirculation valve after the exhaust gas recirculation valve is operated at the second opening angle.

The second opening angle may be greater than the first opening angle.

The measured pressure of the gas may be measured by an intake gas pressure sensor installed in the intake manifold.

The method for monitoring leakage of the exhaust gas recirculation system for the engine may further include: determining, by the controller, whether a change value of a sensor value of an throttle position sensor included in the exhaust gas recirculation system is in a stable state and a lambda feedback control that is a control related to an air-fuel ratio of the engine is in a stable state before it is determined that leakage of the exhaust gas recirculation system occurs.

The method for monitoring leakage of the exhaust gas recirculation system for the engine may further include: when it is determined that leakage of the exhaust gas recirculation system occurs, oxygen sensors measures a lambda value indicating that a ratio of a fuel supplied to the engine is in the lean state to provide the measured value to the controller; and performing, by the controller, a lambda feedback control that is a control related to an air-fuel ratio of the engine to change the ratio of the fuel to a rich state in order to adjust the measured lambda value to a normal lambda value of 1.

The method for monitoring leakage of the exhaust gas recirculation system for the engine of the vehicle according to the exemplary embodiment of the present disclosure may diagnose a small amount of flow leak in the exhaust gas recirculation system of the engine in order to meet the on-board diagnostics (OBD) regulations related to emission gas recirculation (EGR).

Further, the exemplary embodiment of the present disclosure may remove a differential pressure sensor or a temperature sensor used for flow amount measurement from the exhaust gas recirculation system to monitor a leakage flow rate or a leakage flow amount of the exhaust gas recirculation system.

BRIEF DESCRIPTION OF THE DRAWINGS

A brief description of the drawings will be provided to more sufficiently understand the drawings which are used in the detailed description of the present disclosure.

DETAILED DESCRIPTION OF THE EMBODIMENTS

Figure 1:
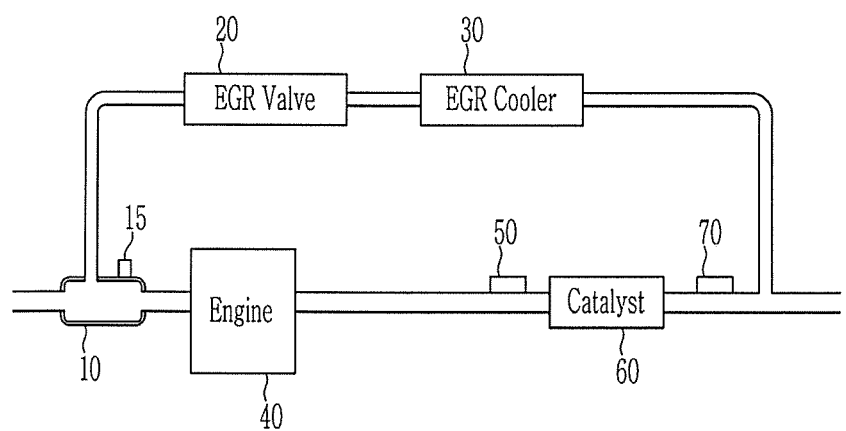
FIG. 1 is a view for explaining an exhaust gas recirculation (EGR) system according to an exemplary embodiment of the present disclosure.

In order to sufficiently understand the present disclosure and the object achieved by embodying the present disclosure, the accompanying drawings illustrating exemplary embodiments of the present disclosure and contents described in the accompanying drawings are to be referenced.

Hereinafter, the present disclosure will be described in detail by describing exemplary embodiments of the present disclosure with reference to the accompanying drawings. In describing the present disclosure, well-known configurations or functions will not be described in detail since they may unnecessarily obscure the gist of the present disclosure. Throughout the accompanying drawings, the same reference numerals will be used to denote the same components.

Terms used in the present specification are only used in order to describe specific exemplary embodiments rather than limiting the present disclosure. Singular forms are to include plural forms unless the context clearly indicates otherwise. It will be further understood that the terms "include" or "have" used in the present specification specify the presence of features, numerals, steps, operations, components, or parts mentioned in the present specification, or a combination thereof, but do not preclude the presence or addition of one or more other features, numerals, steps, operations, components, parts, or a combination thereof.

Throughout this specification and the claims that follow, when it is described that an element is "coupled" to another element, the element may be "directly coupled" to the other element or "electrically or mechanically coupled" to the other element through a third element.

Unless defined otherwise, it is to be understood that the terms used in the present specification including technical and scientific terms have the same meanings as those that are generally understood by those skilled in the art. It must be understood that the terms defined by the dictionary are identical with the meanings within the context of the related art, and they should not be ideally or excessively formally defined unless the context clearly dictates otherwise.

It is necessary to monitor flow amount leakage of an exhaust gas recirculation (EGR) system due to introduction of on-board diagnostics (OBD) regulations.

Figure 2:
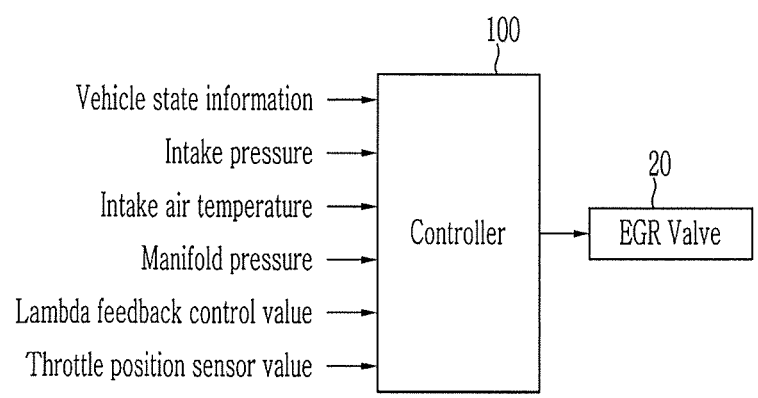
FIG. 2 is a view explaining a controller for controlling an EGR valve shown in FIG. 1.
Figure 3A:
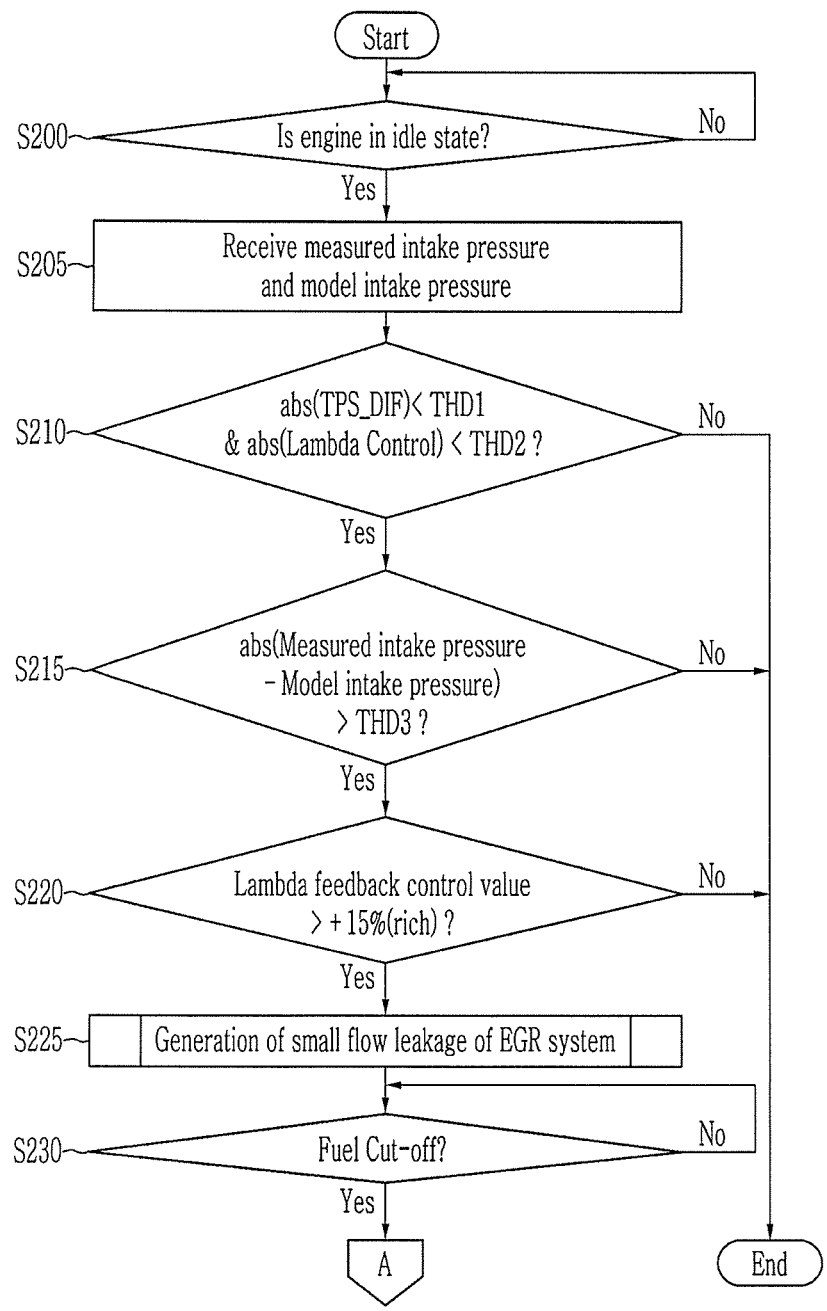
FIGS. 3A and 3B are flowcharts illustrating a method for monitoring leakage of the exhaust gas recirculation system for an engine of a vehicle according to an exemplary embodiment of the present disclosure.
Figure 3B:
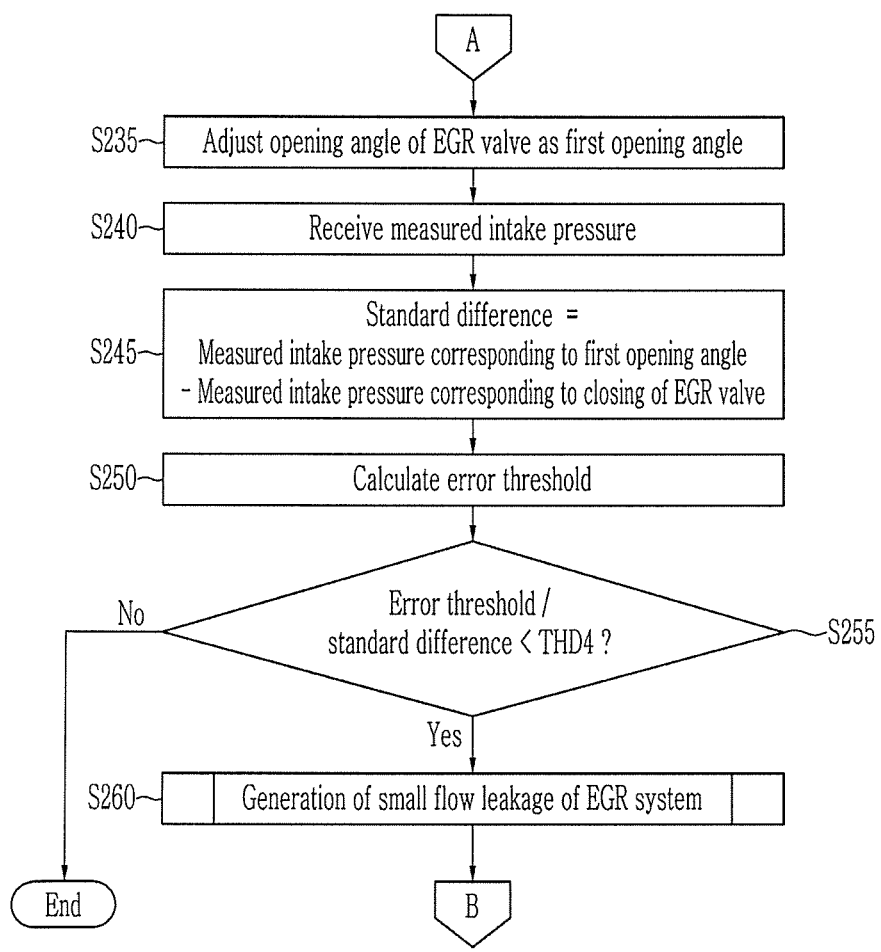
Figure 4:
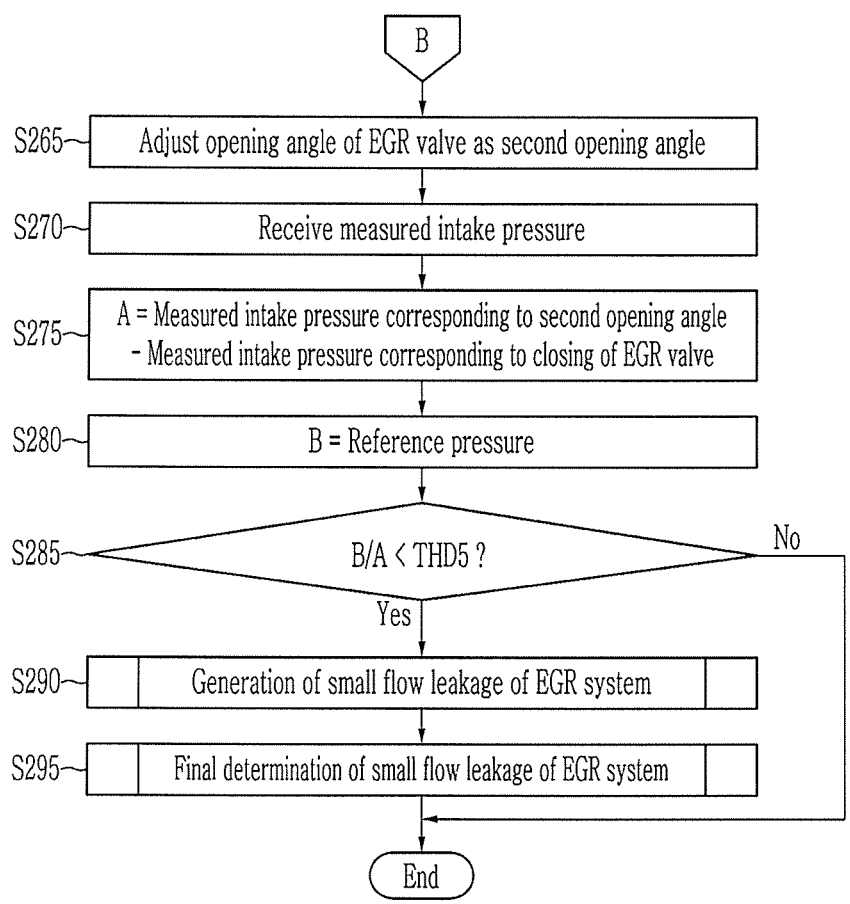
FIG. 4 is a flowchart illustrating steps after secondarily determining a small amount of flow leakage of the exhaust gas recirculation system shown in FIGS. 3A and 3B.
Figure 5:
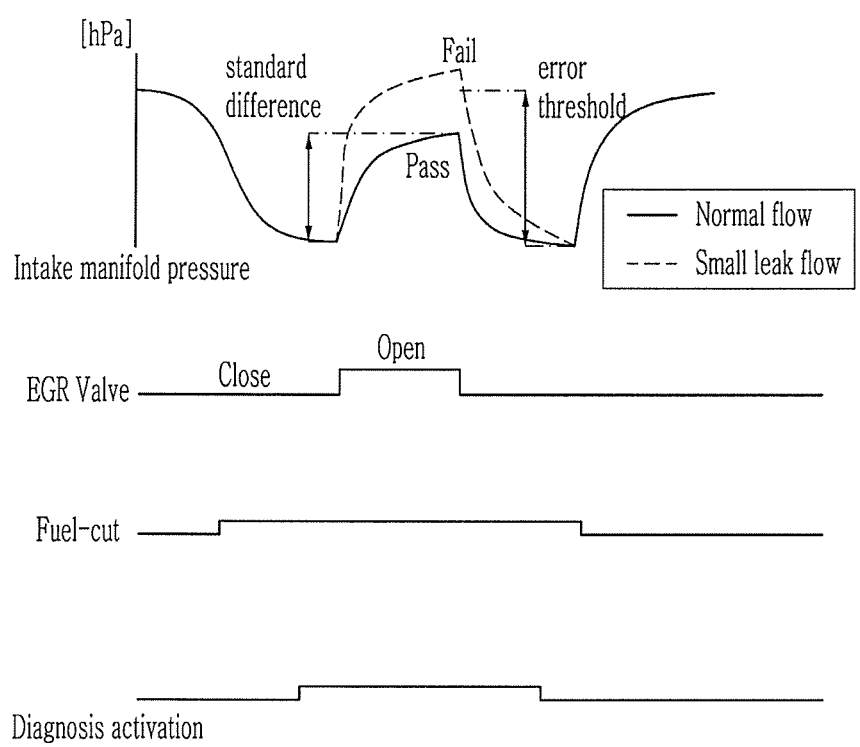
FIG. 5 is a view for explaining step for secondarily determining a small amount of flow leakage of the exhaust gas recirculation system shown in FIGS. 3A and 3B.

FIG. 1 is a view for explaining an exhaust gas recirculation (EGR) system according to an exemplary embodiment of the present disclosure. FIG. 2 is a view explaining a controller for controlling an EGR valve shown in FIG. 1. FIGS. 3A and 3B are flowcharts illustrating a method for monitoring leakage of the exhaust gas recirculation system for an engine of a vehicle according to an exemplary embodiment of the present disclosure. FIG. 4 is a flowchart illustrating steps after secondarily determining a small amount of flow leakage of the exhaust gas recirculation system shown in FIGS. 3A and 3B. FIG. 5 is a view for explaining secondarily determining a small amount of flow leakage of the exhaust gas recirculation system shown in FIGS. 3A and 3B.

Referring to FIGS. 1 to 5, in a determination step S200, a controller 100 may determine whether an engine 40 of the vehicle is in an idle state. For example, the controller 100 may determine whether the engine 40 is in the idle state based on revolutions per minute (RPM) of the engine. For example, in the idle state of the engine 40, the exhaust gas recirculation system (or an EGR valve 20 and an EGR cooler 30 of the exhaust gas recirculation system) may not operate. When the EGR valve 20 is operated, the EGR valve may be opened.

In the EGR system (or an EGR device) shown in FIG. 1, an EGR gas that is cooled by the EGR cooler 30 may flow into a combustion chamber of the engine 40 through the EGR valve 20 opened so that a temperature of the combustion chamber may be lowered. The EGR system may suppress a knock generation region of the engine 40 and may advance an ignition timing of the engine. Therefore, torque of the engine 40 and fuel efficiency of the vehicle may be improved.

An EGR ratio of the EGR system may be determined in consideration of the RPM of the engine 40 or a load of the engine. The EGR ratio may be given by the following equation.

EGR Ratio=EGR gas amount/Total amount of fuel-air mixture

In the above equation, a total amount of the fuel-air mixture may be a value obtained by summing an amount or an air mass of fresh air and the EGR gas amount (e.g., an EGR gas mass).

In the idle state of the engine 40, there may be no change in an opening degree of a throttle valve controlling an intake air amount of the engine and the engine may have an idle RPM. An opening angle of the EGR valve 20 may be adjusted by an electric motor. When leakage of the EGR gas in a non-operating period (e.g., an idle section of the engine 40) of the exhaust gas recirculation system occurs, start of the engine may be turned off and exhaust gas of the vehicle may be increased.

The controller 100, which is an engine management system (EMS), may control an overall operation of the exhaust gas recirculation system including the engine 40. For example, the engine 40 may be a four-cylinder engine or a multi-point injection (MPI) engine. For example, the controller 100 such as an engine control unit (ECU) may be one or more microprocessors operated by a program or hardware including the microprocessor. The program may include a series of commands for executing the method for monitoring leakage of the exhaust gas recirculation system according to the exemplary embodiment of the present disclosure. The commands may be stored in a memory.

Referring to FIG. 2, the controller 100 may determine a target EGR flow amount using the vehicle state information (e.g., revolutions per minute (RPM) or torque of the engine 40), intake air pressure at a front end of an intake manifold 10, intake air temperature at the front end of the intake manifold, pressure of a gas (i.e., fresh air (or a fuel-air mixture) and an EGR gas) sucked into the intake manifold, a lambda feedback control value, and a value of a throttle position sensor (TPS). The controller 100 may control an operation of the EGR valve 20 based on the target EGR flow amount.

According to step S205, the controller 100 may receive a predicted pressure of a gas (i.e., fresh air or a fuel-air mixture and an EGR gas) sucked into the intake manifold 10 connected to the engine 40 and a measured pressure (or an actual measured pressure) of the gas sucked into the intake manifold in the idle state of the engine in which the exhaust gas recirculation system is not operated. The controller 100 may determine the predicted pressure of the intake gas based on a number of rotation (e.g., an RPM) of the engine which is the vehicle state information. For example, the predicted pressure may be determined by a test as a pressure according to an exhaust gas recirculation system predicted corresponding to the exhaust gas recirculation system, and the determined pressure may be stored in a memory. The measured pressure of the intake gas may be measured by an intake gas pressure sensor 15 installed in the intake manifold 10, and the measured pressure may be provided to the controller 100.

According to step S210, in order to determine whether a change value TPS_DIF of a sensor value of the throttle position sensor TPS is in a stable state and a lambda feedback control is in a stable state, the controller 100 may determine whether an absolute value of the change value TPS_DIF of the sensor value of the throttle position sensor for a predetermined time (e.g., 100 (ms)) is less than a first threshold value THD1 and whether an absolute value of a deviation of the lambda feedback control is less than a second threshold value THD2.

The throttle position sensor (TPS) for sensing an opening angle of the throttle valve may be included in the EGR system. The lambda feedback control may be a control related to an air-fuel ratio (A/F) of the engine 40 performed by the controller 100. The lambda A may denote a factor corresponding to the air-fuel ratio, and the air-fuel ratio may increase when the lambda value increases. For example, the A/F may be 14.7 when the lambda is 1, and the A/F may be 14.8 when the lambda is 1.01. The lambda may represent a ratio of an actual air-fuel ratio to a stoichiometric air-fuel ratio. If the lambda is less than 1, a ratio of a fuel supplied to the engine may in a rich state in the air-fuel ratio for the engine. If the lambda exceeds 1, a ratio of a fuel may in a lean state in the air-fuel ratio for the engine.

According to step S215, when the absolute value of the change value of the sensor value of the throttle position sensor is less than the first threshold value and the absolute value of the lambda feedback control deviation is less than the second threshold value, the controller 100 may determine whether an absolute value of a difference value between the measured pressure and the predicted pressure exceeds a third threshold value THD3. For example, the third threshold value THD3 may be 50 hpa. When the absolute value exceeds the third threshold value for a predetermined time, the controller 100 may primarily or firstly determine that a small amount of flow leakage of the exhaust gas recirculation system occurs.

According to step S220, the controller 100 may determine whether the lambda feedback control value exceeds a value (e.g., 15%) for moving or adjusting the ratio of the fuel to the rich state. When there is a small amount of flow leakage in the exhaust gas recirculation system, a first oxygen (O2) sensor 50 and a second oxygen sensor 70 may measure the lambda value indicating that the ratio of the fuel is in the lean state, and may provide the measured value to the controller 100. Accordingly, the controller 100 may perform the lambda feedback control to adjust or change the ratio of the fuel to a rich state in order to adjust the measured lambda value to a normal lambda value of 1.

The oxygen sensors 50 and 70 may be installed on an exhaust pipe at a front end and a rear end of a catalyst 60 for purifying harmful substances of CO, HC, and NOx contained in an exhaust gas. The oxygen sensors 50 and 70 may detect a concentration of oxygen included in the exhaust gas. The oxygen concentration may correspond to the lambda value. The oxygen sensors 50 and 70 may provide the detected oxygen concentration to the controller 100 so that the controller performs the control related to the air-fuel ratio. In another exemplary embodiment of the present disclosure, step S220 may be omitted.

According to step S225, after the lambda feedback control is performed, the controller 100 may determine that a small amount of flow leakage of the exhaust gas recirculation system occurs.

According to step S230, the controller 100 may determine whether supply of fuel to the engine 40 of the vehicle is cut-off. For example, a state in which the supply of fuel is cut-off may include a deceleration state of the vehicle in which the intake gas pressure is constant.

According to step S235, the controller 100 may control or adjust an opening angle of the EGR valve 20 as a first opening angle (e.g., 10% of a total opening angle) when it is determined that the fuel supply to the engine 40 is cut-off.

According to step S240, the controller 100 may receive a measured pressure of the gas that is sucked into the intake manifold 10 and corresponds to the first opening angle of the EGR valve 20 and may receive a measured pressure of the gas that is sucked into the intake manifold and corresponds to a closing of the EGR valve performed after the EGR valve is operated at the first opening angle. The measured pressure of the intake gas may be measured by the intake gas pressure sensor 15 installed in the intake manifold 10.

According to step S245, the controller 100 may calculate a standard difference (a standard deviation) by subtracting the measured pressure of the gas that is sucked into the intake manifold and corresponds to the closing of the EGR valve 20 after the EGR valve is operated at the first opening angle from the measured pressure of the gas that is sucked into the intake manifold and corresponds to the first opening angle of the EGR valve.

According to step S250, the controller 100 may calculate an offset threshold value (or an error threshold value) by subtracting a predicted pressure of the gas that is sucked into the intake manifold and corresponds to the closing of the EGR valve 20 after the EGR valve is operated at the first opening angle from a predicted pressure of the gas that is sucked into the intake manifold and corresponds to the first opening angle of the EGR valve. The controller 100 may determine the predicted pressure of the intake gas based on a number of rotation (e.g., an RPM) of the engine which is the vehicle state information. For example, the predicted pressure may be determined by a test as a pressure according to an exhaust gas recirculation system predicted corresponding to the exhaust gas recirculation system, and the determined pressure may be stored in a memory.

According to step S255, the controller 100 may determine whether a value obtained by dividing the offset threshold value by the standard difference is less than a fourth threshold value THD4. For example, the fourth threshold value THD4 may be 0.75.

According to step S260, when the value obtained by dividing the offset threshold value by the standard difference is less than the fourth threshold value THD4, as shown in FIG. 5, the controller 100 may secondarily or secondly determine that a small amount of flow leakage of the exhaust gas recirculation system occurs.

Steps 230 to 260 will be described in detail. When a first measured pressure calculated using the measured pressure of the gas sucked into the intake manifold 10 due to the first opening angle of the EGR valve 20 and the measured pressure of the gas sucked into the intake manifold due to the closing of the EGR valve after the EGR valve is operated at the first opening angle is greater than a first predicted pressure calculated using the predicted pressure of the gas sucked into the intake manifold due to the first opening angle of the EGR valve and the predicted pressure of the gas sucked into the intake manifold due to the closing of the EGR valve after the EGR valve is operated at the first opening angle, the controller 100 may secondarily determine that a small flow leakage occurs in the exhaust gas recirculation system.

According to step S265, the controller 100 may control or adjust an opening angle of the EGR valve 20 as a second opening angle (e.g., 20% of the total opening angle) when it is determined that the fuel supply to the engine 40 is cut-off.

According to step S270, the controller 100 may receive a measured pressure of the gas that is sucked into the intake manifold 10 and corresponds to the second opening angle of the EGR valve 20, and may receive a measured pressure of the gas that is sucked into the intake manifold and corresponds to a closing of the EGR valve performed after the EGR valve is operated at the second opening angle. The measured pressure of the intake gas may be measured by the intake gas pressure sensor 15 installed in the intake manifold 10.

According to step S275, the controller 100 may calculate a standard difference value A by subtracting the measured pressure of the gas that is sucked into the intake manifold and corresponds to the closing of the EGR valve 20 after the EGR valve is operated at the second opening angle from the measured pressure of the gas that is sucked into the intake manifold and corresponds to the second opening angle of the EGR valve.

According to step S280, the controller 100 may calculate a reference pressure B by subtracting a predicted pressure of the gas that is sucked into the intake manifold and corresponds to the closing of the EGR valve 20 after the EGR valve is operated at the second opening angle from a predicted pressure of the gas that is sucked into the intake manifold and corresponds to the second opening angle of the EGR valve. The controller 100 may determine the predicted pressure of the intake gas based on a number of rotation (e.g., an RPM) of the engine which is the vehicle state information. For example, the predicted pressure may be determined by a test as a pressure according to an exhaust gas recirculation system predicted corresponding to the exhaust gas recirculation system, and the determined pressure may be stored in a memory.

According to step S285, the controller 100 may determine whether a value obtained by dividing the reference pressure B by the standard difference value A is less than a fifth threshold value THD5. For example, the fifth threshold value THD5 may be 0.75.

According to steps S290 and S295, when the value obtained by dividing the reference pressure B by the standard difference value A is less than the fifth threshold value THD5, the controller 100 may finally determine that a small amount of flow leakage occurs in the exhaust gas recirculation system, as shown in FIG. 5.

Describing steps 265 to 295 in detail, when a second measured pressure calculated using the measured pressure of the gas sucked into the intake manifold 10 due to the second opening angle of the EGR valve 20 and the measured pressure of the gas sucked into the intake manifold due to the closing of the EGR valve after the EGR valve is operated at the second opening angle is greater than a second predicted pressure calculated using the predicted pressure of the gas sucked into the intake manifold due to the second opening angle of the EGR valve and the predicted pressure of the gas sucked into the intake manifold due to the closing of the EGR valve after the EGR valve is operated at the second opening angle, the controller 100 may finally determine that a small flow leakage occurs in the exhaust gas recirculation system.

The components, "~ unit", block, or module which are used in the present exemplary embodiment may be implemented in software such as a task, a class, a subroutine, a process, an object, an execution thread, or a program which is performed in a predetermined region in the memory, or hardware such as a field programmable gate array (FPGA) or an application-specific integrated circuit (ASIC), and may be performed with a combination of the software and the hardware. The components, '~ part', or the like may be embedded in a computer-readable storage medium, and some part thereof may be dispersedly distributed in a plurality of computers.

As set forth above, exemplary embodiments have been disclosed in the accompanying drawings and the specification. Herein, specific terms have been used, but are just used for the purpose of describing the present disclosure and are not used for qualifying the meaning or limiting the scope of the present disclosure, which is disclosed in the appended claims. Therefore, it will be understood by those skilled in the art that various modifications and equivalent exemplary embodiments are possible from the present disclosure. Accordingly, the actual technical protection scope of the present disclosure must be determined by the spirit of the appended claims.

What is claimed is:

1. A method for monitoring leakage of an exhaust gas recirculation system for an engine of a vehicle, the method comprising steps of:
    determining, by a controller, whether the engine is in an idle state in which the exhaust gas recirculation system is not operated;
    determining, by the controller, whether leakage of the exhaust gas recirculation system occurs based on a predicted pressure of gas sucked into an intake manifold connected to the engine and a measured pressure of gas sucked into the intake manifold when the engine is in the idle state;
    determining, by the controller, that leakage of the exhaust gas recirculation system occurs when the measured pressure is greater than the predicted pressure; and
    when it is determined that leakage of the exhaust gas recirculation system occurs, determining, by the controller, finally that leakage of the exhaust gas recirculation system occurs based on a measured pressure of gas sucked into the intake manifold according to an opening angle of an exhaust gas recirculation system valve, a measured pressure of gas sucked into the intake manifold according to closing of the exhaust gas recirculation system valve after the exhaust gas recirculation system valve is operated at the opening angle, a predicted pressure of gas sucked into the intake manifold according to the opening angle of the exhaust gas recirculation system valve, and a predicted pressure of gas sucked into the intake manifold according to closing of the exhaust gas recirculation system valve after the exhaust gas recirculation system valve is operated at the opening angle in a state where fuel supply to the engine is cut-off,
    wherein a first measured pressure, which is calculated based on the measured pressure of gas sucked into the intake manifold according to the opening angle of the exhaust gas recirculation system valve and the measured pressure of gas sucked into the intake manifold according to closing of the exhaust gas recirculation valve after the exhaust gas recirculation valve is operated at the opening angle, is greater than a first predicted pressure which is calculated based on the predicted pressure of gas sucked into the intake manifold according to the opening angle of the exhaust gas recirculation valve and the predicted pressure of gas sucked into the intake manifold according to closing of the exhaust gas recirculation valve after the exhaust gas recirculation valve is operated at the opening angle.

2. The method of claim 1, wherein the step of determining finally leakage of the exhaust gas recirculation system occurs comprises steps of:
    determining, by the controller, firstly that leakage of the exhaust gas recirculation system occurs based on a measured pressure of gas sucked into the intake manifold according to a first opening angle of the exhaust gas recirculation system valve, a measured pressure of gas sucked into the intake manifold according to closing of the exhaust gas recirculation system valve after the exhaust gas recirculation system valve is operated at the first opening angle, a predicted pressure of gas sucked into the intake manifold according to the first opening angle of the exhaust gas recirculation system valve, and a predicted pressure of gas sucked into the intake manifold according to closing of the exhaust gas recirculation system valve after the exhaust gas recirculation system valve is operated at the first opening angle; and determining, by the controller, secondly that leakage of the exhaust gas recirculation system occurs based on a measured pressure of gas sucked into the intake manifold according to a second opening angle of the exhaust gas recirculation system valve, a measured pressure of gas sucked into the intake manifold according to a closing of the exhaust gas recirculation system valve after the exhaust gas recirculation system valve is operated at the second opening angle, a predicted pressure of gas sucked into the intake manifold according to the second opening angle of the exhaust gas recirculation system valve, and a predicted pressure of gas sucked into the intake manifold according to closing of the exhaust gas recirculation system valve after the exhaust gas recirculation system valve is operated at the second opening angle, wherein a second measured pressure calculated based on the measured pressure of gas sucked into the intake manifold according to the first opening angle of the exhaust gas recirculation system valve and the measured pressure of gas sucked into the intake manifold according to closing of the exhaust gas recirculation valve after the exhaust gas recirculation valve is operated at the first opening angle is greater than a second predicted pressure calculated based on the predicted pressure of gas sucked into the intake manifold according to the first opening angle of the exhaust gas recirculation valve and the predicted pressure of gas sucked into the intake manifold according to closing of the exhaust gas recirculation valve after the exhaust gas recirculation valve is operated at the first opening angle, and wherein a third measured pressure calculated based on the measured pressure of gas sucked into the intake manifold according to the second opening angle of the exhaust gas recirculation system valve and the measured pressure of gas sucked into the intake manifold according to closing of the exhaust gas recirculation valve after the exhaust gas recirculation valve is operated at the second opening angle is greater than a third predicted pressure calculated based on the predicted pressure of gas sucked into the intake manifold according to the second opening angle of the exhaust gas recirculation valve and the predicted pressure of gas sucked into the intake manifold according to closing of the exhaust gas recirculation valve after the exhaust gas recirculation valve is operated at the second opening angle.

3. The method of claim 2, wherein the second opening angle is greater than the first opening angle.

4. The method of claim 1, further comprising a step of:
before the step of determining that leakage of the exhaust gas recirculation system occurs, determining, by the controller, whether a sensor value of a throttle position sensor included in the exhaust gas recirculation system and an air-fuel ratio of the engine are constant.

5. The method of claim 1, further comprising steps of:
when it is determined that leakage of the exhaust gas recirculation system occurs, measuring, by oxygen sensors, a lambda value indicating that a ratio of a fuel supplied to the engine is in a lean state; and
controlling, by the controller, an air-fuel ratio of the engine to change the ratio of the fuel to be in a rich state to adjust the measured lambda value to be a normal lambda value of 1.

6. The method of claim 1, A method for monitoring leakage of an exhaust gas recirculation system for an engine of a vehicle, the method comprising steps of:
determining, by a controller, whether the engine is in an idle state in which the exhaust gas recirculation system is not operated;
determining, by the controller, whether leakage of the exhaust gas recirculation system occurs based on a predicted pressure of gas sucked into an intake manifold connected to the engine and a measured pressure of gas sucked into the intake manifold when the engine is in the idle state; and
determining, by the controller, that leakage of the exhaust gas recirculation system occurs when the measured pressure is greater than the predicted pressure,
wherein the controller determines the predicted pressure of gas based on a number of rotation of the engine.

7. The method of claim 1, A method for monitoring leakage of an exhaust gas recirculation system for an engine of a vehicle, the method comprising steps of:
determining, by a controller, whether the engine is in an idle state in which the exhaust gas recirculation system is not operate&
determining, by the controller, whether leakage of the exhaust gas recirculation system occurs based on a predicted pressure of gas sucked into an intake manifold connected to the engine and a measured pressure of gas sucked into the intake manifold when the engine is in the idle state; and
determining, by the controller, that leakage of the exhaust gas recirculation system occurs when the measured pressure is greater than the predicted pressure,
wherein the measured pressure of gas is measured by an intake gas pressure sensor disposed in the intake manifold.

* * * * *